United States Patent
Shiota et al.

(10) Patent No.: US 7,626,648 B2
(45) Date of Patent: Dec. 1, 2009

(54) PIXEL CIRCUIT SUBSTRATE, LCD APPARATUS AND PROJECTION DISPLAY APPARATUS HAVING INTERLAYER INSULATING FILM COMPRISING A LAMINATE OF INORGANIC INSULATING MATERIAL HAVING A UNIFORMLY FLAT SURFACE OVER TFT

(75) Inventors: Kunihiro Shiota, Tokyo (JP); Hiroshi Tanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 426 days.

(21) Appl. No.: 11/242,935

(22) Filed: Oct. 5, 2005

(65) Prior Publication Data
US 2006/0098132 A1     May 11, 2006

(30) Foreign Application Priority Data
Nov. 10, 2004   (JP) .............................. 2004-327098

(51) Int. Cl.
G02F 1/136     (2006.01)
(52) U.S. Cl. ................ 349/43; 349/38; 349/47
(58) Field of Classification Search .................... 349/38, 349/39, 43, 47
See application file for complete search history.

(56) References Cited

U.S. PATENT DOCUMENTS 6,141,066 A * 10/2000 Matsushima ................. 349/38
7,122,830 B2 * 10/2006 Ishikawa et al. .............. 257/59

FOREIGN PATENT DOCUMENTS

JP        10-10580      1/1998
JP      2001-281684    10/2001

* cited by examiner

*Primary Examiner*—John Heyman
(74) *Attorney, Agent, or Firm*—Young & Thompson

(57) ABSTRACT

A pixel circuit substrate includes a first interlayer insulating film which is made of an inorganic material at least in a source and drain regions of a thin film transistor. A contact hole is formed in an area above the source and drain regions of a thin film transistor in the first interlayer insulating film. A wiring layer is formed on the first interlayer insulating film, extends to an inner wall and a bottom surface of the contact hole. On a top surface of the wiring layer is formed a recess reflecting the shape of a contact hole. A second interlayer insulating film is formed on the wiring layer, embedded in the recess and has a flat top surface in an area above the thin film transistor. A storage capacitor on the second interlayer insulating film is disposed in the area above the thin film transistor.

19 Claims, 10 Drawing Sheets

1; TRANSMISSION LIQUID CRYSTAL DISPLAY APPARATUS
2; TFT ARRAY SUBSTRATE
3; COUNTER SUBSTRATE
4; LIQUID CRYSTAL LAYER
5,31; GLASS SUBSTRATE
6; SILICON OXIDE FILM(BASE LAYER)
7; POLYCRYSTALLINE SILICON LAYER
8; SILICON OXIDE FILM(GATE INSULATING LAYER)
9; GATE ELECTRODE
10; TFT
11; SILICON OXIDE FILM(FIRST INTERLAYER INSULATING FILM)
12a,12b; CONTACT HOLE
13a,13b; SD WIRING LAYER
14; SILICON OXIDE FILM(SECOND INTERLAYER INSULATING FILM)
14a; FLAT SURFACE
15; LOWER CAPACITOR ELECTRODE
16; SILICON NITRIDE FILM(CAPACITOR INSULATING FILM)
17; UPPER CAPACITOR ELECTRODE
18; STORAGE CAPACITOR
19,24; CONTACT HOLE
20; SILICON OXIDE FILM(THIRD INTERLAYER INSULATING FILM)
21; ORGANIC PLANARIZATION FILM
22; PIXEL ELECTRODE
23,33; ALIGNMENT FILM
32; COUNTER ELECTRODE

Figure 1

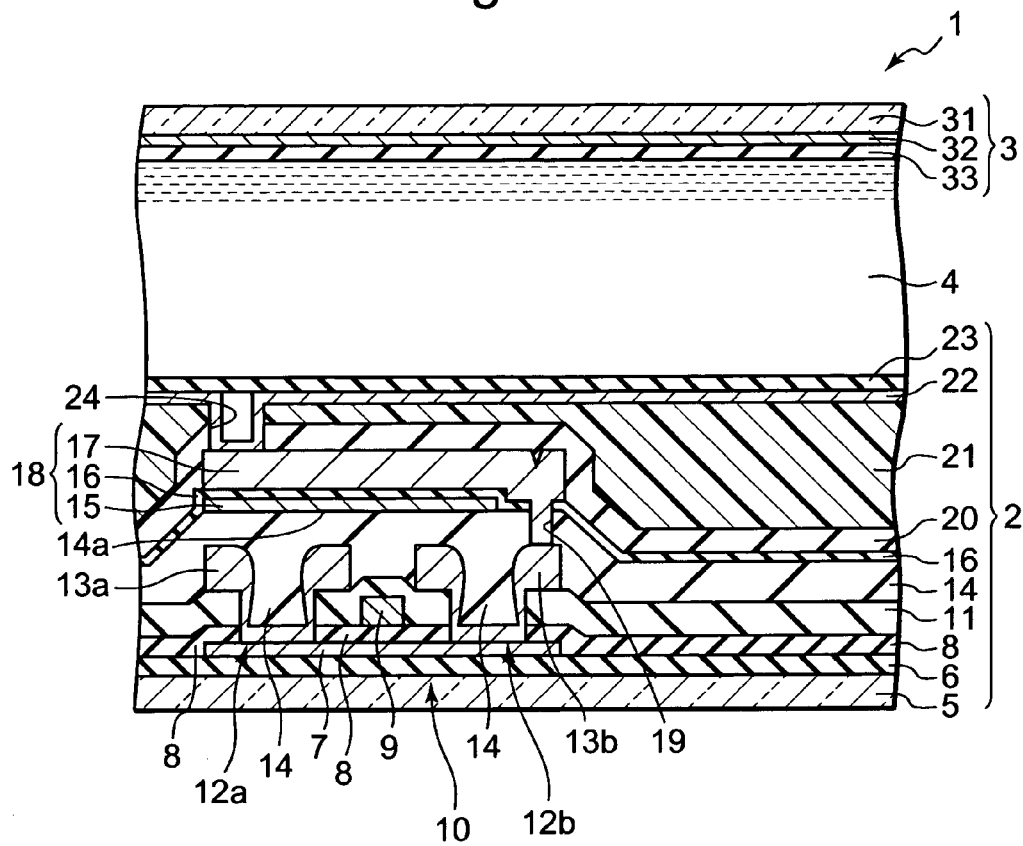

1; TRANSMISSION LIQUID CRYSTAL DISPLAY APPARATUS
3; COUNTER SUBSTRATE
5,31; GLASS SUBSTRATE
6; SILICON OXIDE FILM(BASE LAYER)
8; SILICON OXIDE FILM(GATE INSULATING LAYER)
10; TFT
11; SILICON OXIDE FILM(FIRST INTERLAYER INSULATING FILM)
12a,12b; CONTACT HOLE
14; SILICON OXIDE FILM(SECOND INTERLAYER INSULATING FILM)
15; LOWER CAPACITOR ELECTRODE
16; SILICON NITRIDE FILM(CAPACITOR INSULATING FILM)
17; UPPER CAPACITOR ELECTRODE
19,24; CONTACT HOLE
20; SILICON OXIDE FILM(THIRD INTERLAYER INSULATING FILM)
22; PIXEL ELECTRODE
32; COUNTER ELECTRODE

2; TFT ARRAY SUBSTRATE
4; LIQUID CRYSTAL LAYER

7; POLYCRYSTALLINE SILICON LAYER
9; GATE ELECTRODE 13a,13b; SD WIRING LAYER
14a; FLAT SURFACE

18; STORAGE CAPACITOR

21; ORGANIC PLANARIZATION FILM
23,33; ALIGNMENT FILM

41; DISPLAY AREA 42; PIXEL 43; DATA DRIVER
44; DATA LINE 45; DATA INPUT LINE 46; GATE DRIVER
47; GATE LINE

51; NORMAL PRESSURE CVD DEVICE
52; CHAMBER
53; SUBSTRATE HOLDER
54; HEATER
55; VACUUM ADSORPTION DEVICE
56; DISPERSION HEAD
57; NOZZLE
58,59; SUPPLY TUBE
60; SILICON SOURCE
61; COVER
62; EXHAUST HOLE

7a; POLYCRYSTALLINE SILICON LAYER    25; AMORPHOUS SILICON LAYER

27; SILICON OXIDE FILM(SECOND INTERLAYER INSULATING FILM)

80; LIQUID CRYSTAL PROJECTOR APPARATUS
82a,82b; HALF MIRROR
84R; LIGHT BULB FOR RED COLOR
84B; LIGHT BULB FOR BLUE COLOR
86; PROJECTION LENS GROUP
88W,89; WHITE LIGHT
88G; GREEN LIGHT

81; HALOGEN LAMP
83a,83b,83c; MIRROR
84G; LIGHT BULB FOR GREEN COLOR
85; PRISM
87; SCREEN
88R; RED LIGHT
88B; BLUE LIGHT

PIXEL CIRCUIT SUBSTRATE, LCD APPARATUS AND PROJECTION DISPLAY APPARATUS HAVING INTERLAYER INSULATING FILM COMPRISING A LAMINATE OF INORGANIC INSULATING MATERIAL HAVING A UNIFORMLY FLAT SURFACE OVER TFT

BACKGROUND OF THE INVENTION

1. Field of the Invention

The present invention relates to a liquid crystal display apparatus in which a thin film transistor and a storage capacitor are provided in each pixel, a method of manufacturing this liquid crystal display apparatus, and a projection display apparatus which uses the liquid crystal display apparatus as a light bulb.

2. Description of Related Art

Electrooptic apparatus, such as liquid crystal display apparatus, are used as direct-view display units of various kinds of equipment, and they are also used in light bulbs of projection display apparatus, such as a data projector. Among these electrooptic apparatus, in an active matrix type liquid crystal display apparatus, a TFT array substrate and a counter substrate which is disposed opposite to this TFT array substrate are provided, and a liquid crystal as an electrooptic substance is disposed between the two substrates. In the TFT array substrate, multiple pixel circuits are formed in matrix shape on a transparent substrate made of glass etc.

On the TFT array substrate, multiple data lines extending in one direction and multiple scanning lines extending in the direction orthogonal to the data lines and a pixel circuit is provided at each nearest point of contact of a data line and a scanning line. In each pixel circuit, a pixel electrode which is formed from an electrically conductive transparent film, such as an ITO film (indium tin oxide film) and a thin film transistor (hereinafter referred to as a TFT) for pixel switching are provided. In this TFT, its gate is connected to a scanning line and a changeover is performed as to whether a data line is connected to a pixel electrode or not by the potential of the scanning line. Each pixel circuit is provided with a storage capacitor which holds a potential applied to the pixel electrode. One electrode of the storage capacitor may sometimes serve as a black matrix (hereinafter referred to also as a BM) layer. The BM layer is used for the light shielding of the data lines, scanning lines and TFTs. Furthermore, a capacitor line may sometimes be formed on the TFT array board. On the other hand, on the whole surface of the counter substrate is formed a counter electrode (a common electrode). In the same manner as pixel electrode, the counter electrode is also formed from an electrically conductive transparent film, such as an ITO film.

In order to realize the high image quality design, i.e., high brightness design and high contrast design of such a transmission type liquid crystal display apparatus or a projection display apparatus on which this transmission type liquid crystal display apparatus is mounted, it is necessary to improve the transmittance of light of this transmission type liquid crystal display apparatus. In order to improve the transmittance of light, it is necessary to improve the aperture ratio of a pixel region in a TFT array substrate, and for this purpose, it is necessary to minimize the area of non-aperture regions other than the aperture region in each pixel, i.e., the area of non-aperture regions where metal wiring, such as the above-described data lines, scanning lines and capacitor lines, TFTs, and storage capacitors, etc. However, it becomes impossible to ensure necessary capacitance values if storage capacitors are too much miniaturized. Thus, in a liquid crystal display apparatus as described above, it has become an important consideration to manage the tradeoff between the improvement of the aperture ratio in each pixel and the ensuring of the storage capacitance for higher image quality.

JP2001-281684 (reference 1) discloses a technique for forming a storage capacitor above a TFT and metal wiring in a TFT array substrate which constitutes a liquid crystal display apparatus. That is, reference 1 discloses a technique by which TFTs as switch elements are provided in multiple layers on a substrate, contacts are connected respectively to the source and drain electrodes of the TFTS, a capacitor electrode is provided above one contact so as to be connected to this contact, a pixel electrode is provided above this capacitor electrode, a BM layer is provided between the capacitor electrode and the pixel electrode, and a storage capacitor is formed between the capacitor electrode and the BM layer. As a result of this, because it is possible to save the region in which the storage capacitor is formed and to reduce the area of non-aperture regions, it is possible to achieve expansion of the pixel aperture ratio as well as maintaining sufficiently large capacitor values.

However, when the manufacturing method described in reference 1 above is actually performed, it has been proven experimentally that such approach results in capacitor leakage. This has the detrimental effect of decreasing contrast. The surface of the interlayer film formed above the TFT, contact and metal wiring is marked by irregularities. These irregularities reflect the shapes of the TFT, contact, metal wiring, etc. that lie thereunder.

When the storage capacitor is formed on the surface on which the irregularities are formed, the spacing between an electrode layer (capacitor electrode) below the storage capacitor and an electrode layer (BM layer) above the storage capacitor becomes nonuniform. As a result of such nonuniformity, leakage current is generated in those portions where the spacing between the two electrodes narrows. This is called capacitor leakage. When capacitor leakage occurs, image contrast decreases.

In order to prevent such capacitor leakage, it is necessary to design the spacing between the two electrodes to be sufficiently large. This, of course, has the negative effect of decreasing the capacitance value.

On the other hand, JP 10-10580 (reference 2) discloses a technique by which a TFT is formed on a substrate, a first organic resin layer having a flat top surface is formed, so as to embed this TFT, a common metal electrode which serves also as a BM layer is formed, a second organic resin layer having a flat top surface is formed to as to embed this common electrode, and a pixel electrode is formed on this second organic resin layer. And an auxiliary capacitor is formed in a region in which the common electrode and the pixel electrode overlap each other planimetrically. According to this technique, an organic resin layer is formed as an insulating layer which embeds the TFT and, therefore, the top surface of the organic resin layer can be planarized.

As a result of this, the common electrode can be planarized and hence the spacing between the common electrode and the pixel electrode can be made constant. As a result of this, it is possible to increase the capacitance value of the auxiliary capacitor while preventing capacitor leakage.

However, the above-described conventional techniques have the following problems. As described in reference 2, when a base layer of the capacitor electrode on the lower layer side in the storage capacitor is formed by an organic resin layer, the process temperature after the formation of the organic resin layer is limited to temperatures which the organic resin layer can withstand. For this reason, only an insulating film formed at a low temperature can be used as the capacitor insulating film of the storage capacitor, with the result that only a capacitor of low insulating properties can be used.

SUMMARY OF THE INVENTION

The present invention has been made in view of the problems as described above and has its object the provision of a liquid crystal display apparatus which has high brightness and large image contrast and can be manufactured at low cost and with ease, a method of manufacturing this liquid crystal display apparatus, and a projection display apparatus.

A pixel circuit substrate comprises a substrate, a thin film transistor formed on the substrate, a first interlayer insulating film which is made of an inorganic material at least on source and drain regions of the thin film transistor and in which a contact hole is formed in an area immediately above the source and drain regions of the thin film transistor, a wiring layer which is formed on the first interlayer insulating film, extends to an inner wall and a bottom surface of the contact hole, is connected to the source and drain regions and on a top surface of which a recess reflecting the shape of the contact hole is formed, a second interlayer insulating film which is formed on the wiring layer, embedded in the recess and has a flat top surface in the area immediately above the thin film transistor, and a storage capacitor on the second interlayer insulating film which is disposed in the area immediately above the thin film transistor.

BRIEF DESCRIPTION OF THE DRAWINGS

FIG. 1 is a sectional view of a transmission type liquid crystal display apparatus related to the first embodiment of the present invention.

DETAILED DESCRIPTION OF PREFERRED EMBODIMENTS

The inventors have discovered that the capacitor leakage occurs at the contact hole where there is formed a large recess step. It's important that the large recess at the contact hole be eliminated. In order to avoid the effect of the contact hole, it is conceivable to adopt a method by which an electrically conductive material is completely filled in the interior of the contact hole. However, it is difficult to carry out this method for a contact hole formed in a large-sized glass substrate. Furthermore, when the storage capacitor is formed by avoiding the area immediately above the contact hole, the layout within a pixel is limited and the expansion of the pixel aperture ratio is limited.

Hence, in the present invention, a second interlayer insulating film is embedded in the recess reflecting the shape of the contact hole. A pixel circuit substrate has TFTs and storage capacitor. A first interlayer insulating film which covers TFTs is made of an inorganic material and a contact hole is formed in the first interlayer insulating film. A wiring layer is formed on the first interlayer insulating film, and a recess reflecting the shape of the contact hole is formed on a top surface of the wiring layer. The second interlayer insulating film is embedded in the recess. Then, a storage capacitor on the second interlayer insulating film which has a flat top surface is formed.

Specifically, the second interlayer insulating film is a silicon oxide film formed by an $O_3$-alkoxysilane reaction or by an $O_3$-hexamethyldisiloxane reaction by a normal pressure CVD method. As a result of this, the second interlayer insulating film can be positively embedded in the recess of the wiring layer above the contact hole.

Furthermore, after the formation of a TFT and a contact hole, an insulating film made of an inorganic material is formed to be thick, then this insulating film may be planarized by polishing by chemical mechanical polishing (CMP), and then a storage capacitor may be formed on the insulating film.

Thereby, the insulating film is embedded in the recess of the contact hole so that a top surface above TFT can be flattened and a storage capacitor can be put on an area above the TFT. At this time, an inorganic film is used as the insulating film so that it is possible to improve the capacitance value of the storage capacitor and the contrast of an image.

Figure 2:
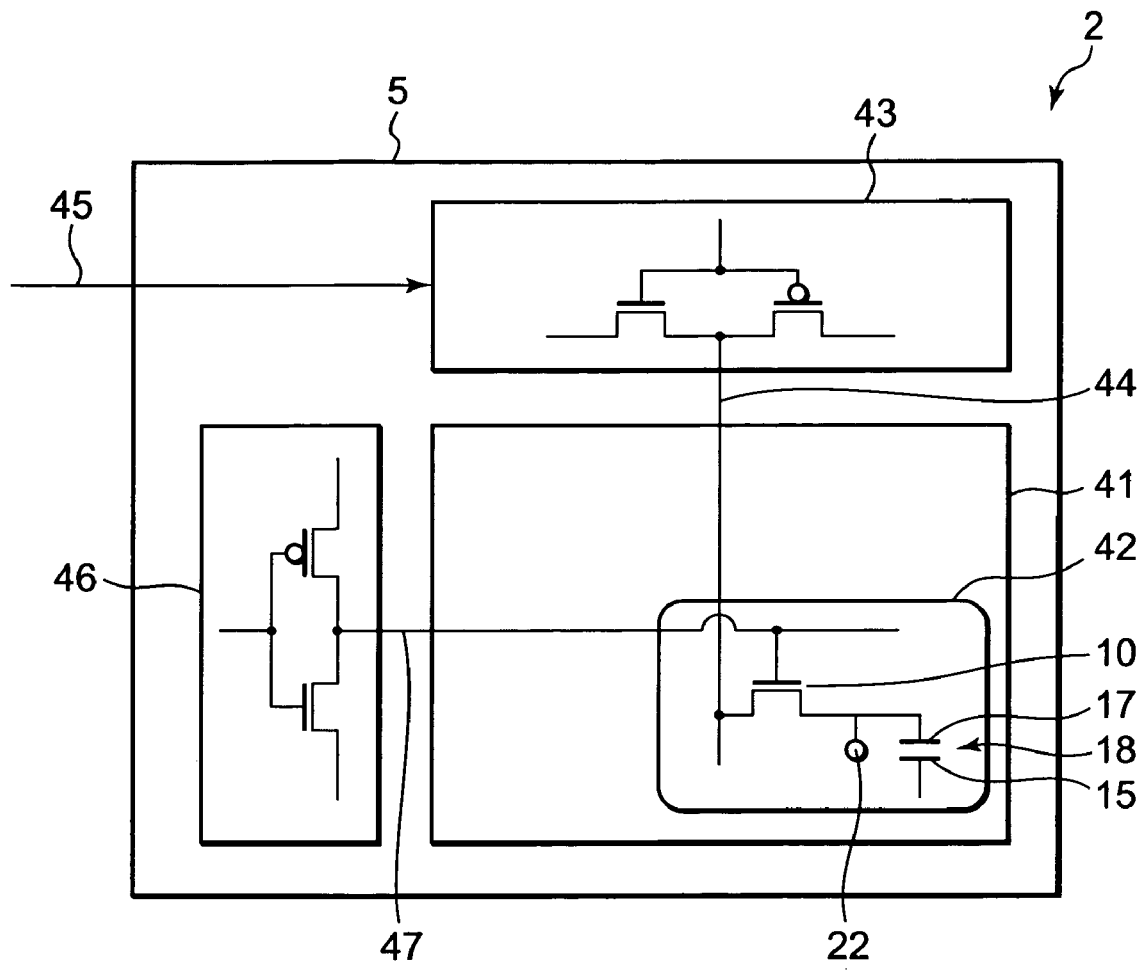
FIG. 2 is a circuit diagram of this transmission type liquid crystal display apparatus.

Embodiments of the present invention will be concretely described below by referring to the accompanying drawings. First, the first embodiment of the present invention will be described. FIG. 1 is a sectional view of a transmission type liquid crystal display apparatus related to the first embodiment of the present invention, and FIG. 2 is a circuit diagram of this transmission type liquid crystal display apparatus. A transmission type liquid crystal display apparatus related to this embodiment is used, for example, as a light bulb of a projection display apparatus, such as a data projector.

As shown in FIG. 1, in a transmission type liquid crystal display apparatus 1 related to this embodiment, a TFT array substrate 2 as a pixel circuit substrate and a counter substrate 3 are provided parallel to each other and opposite to each other. A liquid crystal layer 4 is disposed between the TFT array substrate 2 and the counter substrate 3.

In the TFT array substrate 2, a glass substrate 5 is provided and a silicon oxide film 6 having a film thickness of 1 μm, for example, is provided in the whole area of the surface of this glass substrate 5 on the counter substrate 3 side. The silicon oxide film 6 functions as the base film of TFT by shutting off impurities diffusing from the glass substrate 5 and preventing the pollution of the TFT by impurities, which will be described later. A polycrystalline silicon layer 7 is provided on part of the silicon oxide film 6. This polycrystalline silicon layer 7 becomes an active layer of the TFT. And a silicon oxide film 8 is provided in the whole area on the silicon oxide film 6 in such a manner as to cover the polycrystalline silicon layer 7. A gate electrode 9, which is formed from, for example, tungsten silicide (WSi), chromium (Cr) or aluminum (Al), is provided partially on the surface of the silicon oxide film 8. Incidentally, the portion corresponding to the area immediately under the gate electrode 9 in the polycrystalline silicon layer 7 becomes the channel region of the TFT, and the portions on both sides of the channel region in the polycrystalline silicon layer 7 become the source and drain regions. The portion on the surface of the polycrystalline silicon layer 7 in the silicon oxide film 8 functions as a gate insulating film of the TFT. The TFT 10 is constituted by the polycrystalline silicon layer 7 (channel region, source and drain regions), the silicon oxide film 8 (gate insulating film) and the gate electrode 9.

A silicon oxide film 11 is provided in the whole area on the silicon oxide film 8 in such a manner as to cover the gate electrode 9. The silicon oxide film 11 is a first interlayer insulating film. And two contact holes 12a and 12b are formed in the silicon oxide films 8 and 11. Each of the contact holes 12a and 12b reaches the source and drain regions of the polycrystalline silicon layers 7. SD wiring layers 13a and 13b, which are formed from, for example, Al, are provided respectively in the regions including the areas immediately above the contact holes 12a and 12b on the silicon oxide film 11. The Al layers which constitute the SD wiring layers 13a and 13b are formed also in inner walls and bottom portions of each of the contact holes 12a and 12b. As a result of this, the SD wiring layer 13a is connected to one of the source and drain regions of the polycrystalline silicon layer 7 via the contact hole 12a, and the SD wiring layer 13b is connected to the other of the source and drain regions of the polycrystalline silicon layer 7 via the contact hole 12b. The SD wiring layers 13a and 13b extend to the inner walls and bottom surfaces of the contact holes 12a and 12b. As a result of this, in the portions corresponding to the areas immediately above the contact holes 12a and 12b in the SD wiring layers 13a and 13b, the top surfaces are recessed so as to reflect the shapes of the contact holes 12a and 12b, and the recesses are in communication with the interior of the contact holes 12a and 12b.

A silicon oxide film 14 is provided on the silicon oxide film 11. The silicon oxide film 14 is a laminated film that is formed by laminating an $SiO_2$ film, which is formed by a tetra-ethyl-ortho-silicate (TEOS: $Si(OC_2H_5)_4$: alkoxysilane)—$O_3$ reaction by a normal pressure chemical vapor deposition (CVD) method in which the $O_3$ concentration in $O_2$ is in the range of 100 to 200 $g/m^3$, for example, 160 $g/m^3$ (hereinafter also referred to as a high concentration $O_3$-TEOS-based $SiO_2$ film) on an $SiO_2$ film having a film thickness of, for example 100 nm, which is formed by an $O_3$-TEOS reaction by a normal pressure CVD method in which the $O_3$ concentration in $O_2$ is in the range of 5 to 20 $g/m^3$, for example, 10 $g/m^3$ (hereinafter also referred to as a low concentration $O_3$-TEOS-based $SiO_2$ film). The silicon oxide film 14 is embedded also in the interior of the contact holes 12a and 12b and within the recesses of the SD wiring layers 13a and 13b (hereinafter also collectively referred to as the recesses), with the result that the portion corresponding to the area immediately above the polycrystalline silicon layer 7 in the silicon oxide film 14 has a flat top surface. Incidentally, in the silicon oxide film 14, the high concentration $O_3$-TEOS-based $SiO_2$ film is formed with a larger thickness than the low concentration $O_3$-TEOS-based $SiO_2$ film and, therefore, the interior of the recesses is virtually filled with the high concentration $O_3$-TEOS-based $SiO_2$ film. The portion of the area immediately above the polycrystalline silicon layer 7 on the top surface of the silicon oxide film 14 is higher than the portion other than the area immediately above the polycrystalline silicon layer 7, and a step formed by an inclined surface is formed at the boundary of the two portions. The silicon oxide film 14 is a second interlayer insulating film.

A lower capacitor electrode 15, which is formed from, for example, Cr and has a film thickness of 0.2 μm, is provided on the top surface (hereinafter referred to as the flat surface 14a) of the portion corresponding to the area immediately above the polycrystalline silicon layer 7 in the silicon oxide film 14. And a silicon nitride film 16, having a film thickness of, for example, 0.1 μm, is provided in the whole area on the silicon oxide film 14 in such a manner as to cover this lower capacitor electrode 15. Furthermore, an upper capacitor electrode 17, which is formed from, for example, Al and has a film thickness of 0.2 μm, is provided in the region including the area immediately above the lower capacitor electrode 15 in the silicon nitride film 16. The upper capacitor electrode 17 also serves as a light shielding film. The portion of the silicon nitride film 16 present between the lower capacitor electrode 15 and the upper capacitor electrode 17 is a capacitor insulating film. As a result of this, a storage capacitor 18 is constituted by the lower capacitor electrode 15, the silicon nitride film 16 and the upper capacitor electrode 17. A contact hole 19 is formed in the silicon nitride film 16 and the silicon oxide film 14, and the upper capacitor electrode 17 is connected to the SD wiring layer 13b via this contact hole 19.

Also, a silicon nitride film 20, which has a film thickness of, for example, 0.4 μm, is provided in the whole area on the silicon nitride film 16 in such a manner as to cover the upper capacitor electrode 17. The silicon nitride film 20 is a third interlayer insulating film. Furthermore, an organic planarization film 21 formed from an organic resin is provided in the whole area on the silicon nitride film 20. The organic planarization film 21 is formed by an application method and the top surface of this film is flat. The average coating thickness of the organic planarization film 21 is, for example, 1.2 μm.

A pixel electrode 22 formed from an ITO film which is patterned for each pixel is provided in part of the top of the organic planarization film 21, and an alignment film 23 is provided in the whole area on the organic planarization film 21 in such a manner as to cover the pixel electrode 22. The alignment film 23 is in contact with the liquid crystal layer 4. Also, a contact hole 24 is formed in the silicon nitride film 20 (the third interlayer insulating film) and the organic planarization film 21, and the pixel electrode 22 is connected to the upper capacitor electrode 17 via the contact hole 24. That is, the pixel electrode 22, upper capacitor electrode 17 and SD wiring layer 13b are connected to each other.

On the other hand, in the counter substrate 3, a glass substrate 31 is provided, and a counter electrode 32 formed from ITO is provided on the surface of this glass substrate 31 on the TFT array substrate 2 side. Also, an alignment film 33 is provided on the whole area on the counter electrode 32. The alignment film 33 is in contact with a liquid crystal layer 4.

In the transmission type liquid crystal display apparatus 1 thus constructed, when the unit area of each pixel is denoted by X and a total value of an effective area of a contact hole in each pixel is denoted by Y, the value of the ratio (Y/X) is equal to or more than 0.01 (%).

As shown in FIG. 2, a rectangular display area 41 is provided on the glass substrate 5 of the TFT array substrate 2, and multiple pixels 42 are arranged in the display area 41 in a matrix shape. Outside the display area 41 on the glass substrate 5, a data driver 43 is provided in one side of the display area 41. Multiple data lines 44 are drawn from the data driver 43. Each of the data lines 44 extends in one direction and is connected one of the source and or the drain of the FTT 10 in each pixel 42. The other of the source and drain of the TFT 10 is connected to the upper capacitor electrode 17 of the storage capacitor 18 (refer to FIG. 1) and the pixel electrode 22 (refer to FIG. 1). A data input line 45 is connected to the data driver 43, and driving data based on image data is inputted to the data driver 43 from the outside via the data input line 45.

A gate driver 46 is provided in the side adjoining to the side of the data driver 43 in the display area 41. Multiple gate lines 47 are drawn from the gate driver 46, extend in the direction orthogonal to the direction in which the data line 44 extends, and are connected to the gate of the TFT 10. Incidentally, in FIG. 2, for the sake of convenience, only one pixel 42, only one data line 44 and only one gate line 47 are shown. In actuality, however, they are provided in multiple numbers.

In this embodiment, the low concentration $O_3$-TEOS-based $SiO_2$ film which constitutes the lower layer of the silicon oxide film 14 eliminates the effect of the base material, ensures that the high concentration $O_3$-TEOS-based $SiO_2$ film can be formed in a stable manner thereon and functions as the base film of the high concentration $O_3$-TEOS-based $SiO_2$ film. And because the high concentration $O_3$-TEOS-based $SiO_2$ film constitutes the upper layer of the silicon oxide film 14, it is ensured that the silicon oxide film 14 is positively formed also in the interior of the contact holes 12a and 12b and that the recesses of the DS wiring layers 13a and 13b including the interior of the contact holes 12a and 12b can be embedded. As a result of this, it is possible to planarize the top surface of the silicon oxide film 14 present in the area immediately above the polycrystalline silicon layer 7, including the area immediately above the contact holes 12a and 12b.

By forming the lower capacitor electrode 15 of the storage capacitor 18 on the flat surface 14a, forming the silicon nitride film 16 as a capacitor insulating film on the lower capacitor electrode 15, and forming the upper capacitor electrode 17 on the silicon nitride film 16, the spacing between the lower capacitor electrode 15 and the upper capacitor electrode 17 can be kept uniform even when the thickness of the silicon nitride film 16 reduced, and it is possible to prevent capacitor leakage while ensuring the high capacitance value of the storage capacitor 18. For this reason, in the transmission type liquid crystal display apparatus 1, a sufficient capacitance value can be obtained even when the aperture ratio of a pixel is raised by disposing the storage capacitor 18 in the region immediately above the TFT 10, and it is possible to display a high-quality image having high brightness and high contrast.

Also, in this embodiment, because it is possible to form the storage capacitor 18 also in the area immediately above the contact holes 12a and 12b, the layout of the storage capacitor 18 is not limited by the contact holes 12a and 12b. That is, the layout of the storage capacitor 18 is free. As a result, it is possible to improve the aperture ratio of the transmission type liquid crystal display apparatus 1 while ensuring the high capacitance value of the storage capacitor 18.

Furthermore, an organic resin film is not formed in the step before the formation of the silicon nitride film 16 and all insulating films are formed from inorganic materials, the silicon oxide film 16 can be formed by using a high temperature process. As a result, the capacitance value of the storage capacitor 18 can be increased.

Moreover, in this embodiment, the manufacturing cost of a transmission type liquid crystal display apparatus is low because it is unnecessary to form insulating layers formed from inorganic materials in large thicknesses and it is also unnecessary to perform the polishing process such as CMP.

Figure 3:
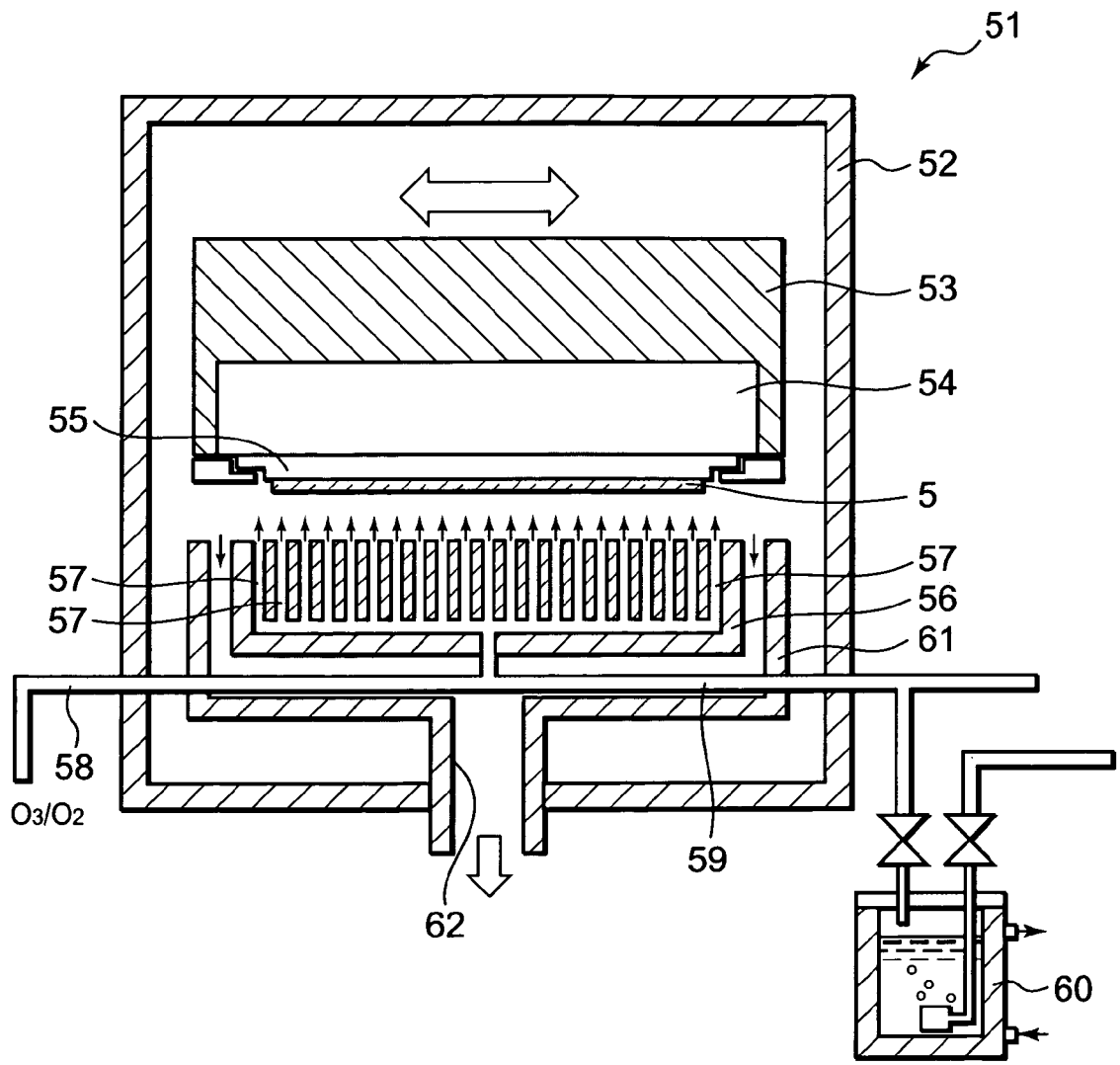
FIG. 3 is a diagram of a normal pressure CVD device used in the second embodiment of the present invention.

Next, the second embodiment of the present invention will be described. This embodiment is an embodiment of a method of manufacturing a transmission type liquid crystal display apparatus related to the first embodiment described above. FIG. 3 is a diagram of a normal pressure CVD device used in this embodiment. FIGS. 4A to 4E, FIGS. 5A to 5D, FIGS. 6A to 6C, FIGS. 7A to 7C, and FIGS. 8A to 8C are each a sectional view which shows a method of manufacturing a TFT array substrate of a transmission type liquid crystal display apparatus related to this embodiment in order of steps.

As shown in FIG. 3, a normal pressure CVD device 51 used in this embodiment, a chamber 52 is provided, and a substrate holder 53 is provided in this chamber 52. The substrate holder 53 can perform reciprocating motions in the horizontal direction. And, a heater 54 is embedded in the lower part of the substrate holder 53, and a vacuum adsorption device 55 is provided below the heater 54. A glass substrate 5 of a TFT array substrate is held by the bottom surface of the substrate holder 53 by being vacuum adsorbed onto it.

A dispersion head 56 is provided below the substrate holder 53. Multiple nozzles 57 are provided on the dispersion head 56 in such a manner as to be opposed to the bottom surface of the substrate holder 53. And a supply tube 58 which supplies $O_3/O_2$ gas and a supply tube 59 which supplies a gas containing Si, for example, TEOS gas are in communication with each nozzle 57 of the dispersion head 56. The supply tube 59 is in communication with a silicon source 60. Furthermore, a cover 61 which covers the side surfaces and bottom surface of the dispersion head 56 is provided beside and below the dispersion head 56, and in a position corresponding to the center part below the dispersion head 56 in the cover 61, there is formed an exhaust hole 62. The exhaust hole 62 exhausts reaction gases (reactor) from inside the chamber 52.

Figure 4A:
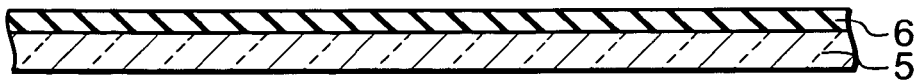
FIGS. 4A to 4E are each a sectional view which shows a method of manufacturing a TFT array substrate of a transmission type liquid crystal display apparatus related to this embodiment in order of steps.

Next, a method of manufacturing a transmission type liquid crystal display device will be described. First, as shown in FIG. 4A, a silicon oxide film 6 is formed on a glass substrate 5 by the CVD method. This silicon oxide film 6 is a base film which prevents impurities such as metals from the glass substrate 5 which is used as the base material from diffusing during the TFT forming step and exerting an electrical effect on the TFT 10 (refer to FIG. 1). For this reason, the film thickness of the silicon oxide film 6 (base film) must be large enough to shut off the diffusion of the impurities. The film thickness of the silicon oxide film 6 is, for example, 1 μm.

Figure 4B:
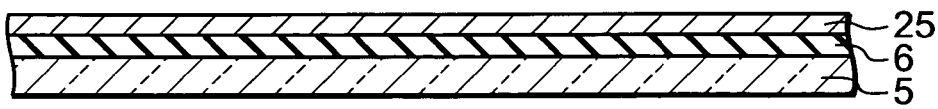

Next, as shown in FIG. 4B, an amorphous silicon layer 25 is formed on the silicon oxide film 6 (base film), which has a film thickness of, for example, 0.03 to 0.06 μm, by the CVD method. Next, a required amount of dopant is implanted by the ion implantation method into a portion of this amorphous silicon layer 25 where a channel region is to be formed.

Figure 4C:
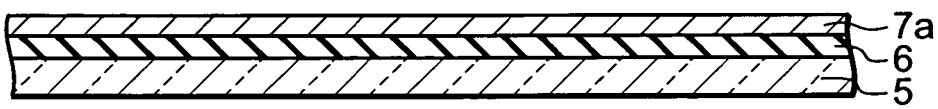
Figure 4D:
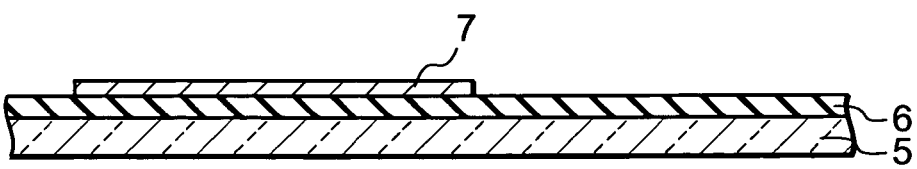
Figure 4E:
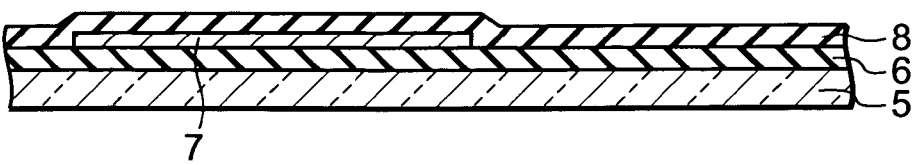

Next, as shown in FIG. 4C, the amorphous silicon layer 25 is subjected to laser annealing treatment by being irradiated with laser light, and the amorphous silicon layer 25 is crystallized thereby. As a result of this, the amorphous silicon layer 25 becomes a polycrystalline silicon layer 7a. Next, as shown in FIG. 4D, photolithography and etching are performed, whereby the polycrystalline silicon layer 7a is selectively removed and patterned and a polycrystalline silicon layer 7 is formed. At this time, the portion of the polycrystalline silicon layer 7 where the dopant was implanted in the step shown in FIG. 4B becomes a channel region and the regions on both sides of the channel region become source and drain regions. Next, as shown in FIG. 4E, a silicon oxide film 8 (gate insulating film), which has a film thickness of, for example, 0.1 μm, is formed by the CVD method in the whole area on the silicon oxide film 6 in such a manner as to cover the polycrystalline silicon layer 7.

Figure 5A:
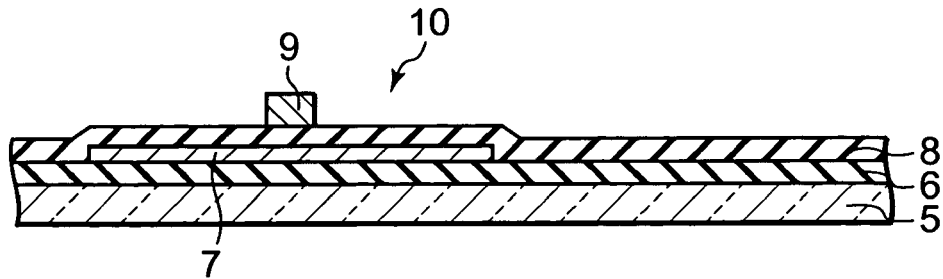
FIGS. 5A to 5D are each a sectional view which shows a method of manufacturing a TFT array substrate of a transmission type liquid crystal display apparatus related to this embodiment in order of steps, and that the steps after FIG. 4E.

Next, as shown in FIG. 5A, a film made of a gate wiring material, such as WSi, Cr or Al, is formed on a silicon oxide film 8 (gate insulating film), and patterned so that this film remains only in part of the region immediately above the polycrystalline silicon layer 7, whereby a gate electrode 9 is formed. As a result of this, a TFT 10 is formed by the polycrystalline silicon layer 7 (the channel region, the source and drain regions), the silicon oxide film 8 (gate insulating film) and the gate electrode 9.

Figure 5B:
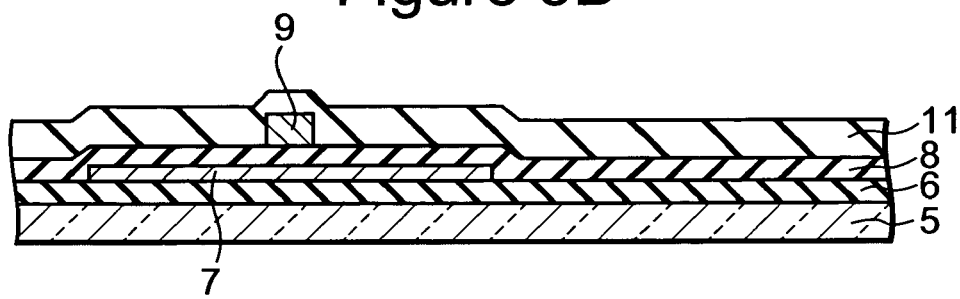
Figure 5C:
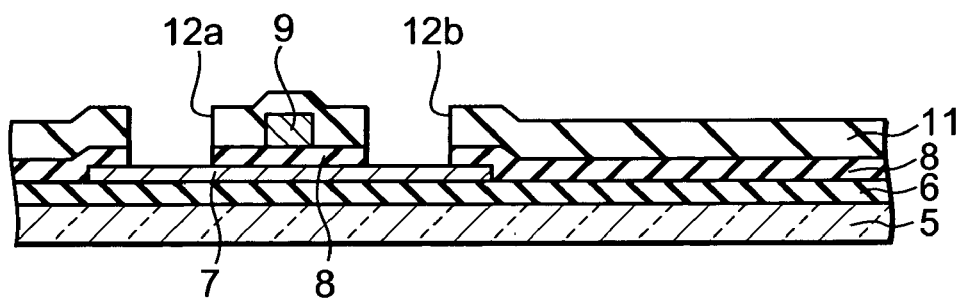

Next, as shown in FIG. 5B, a silicon oxide film 11, which has a film thickness of, for example, 0.4 μm, is formed by the CVD method in the whole area on the silicon oxide film 8 in such a manner as to cover the gate electrode 9. The silicon oxide film 11 becomes a first interlayer insulating film. Next, as shown in FIG. 5C, contact holes 12a and 12b are formed in the silicon oxide films 11 and 8 in such a manner as to reach the source and drain regions of the polycrystalline silicon layer 7.

Figure 5D:
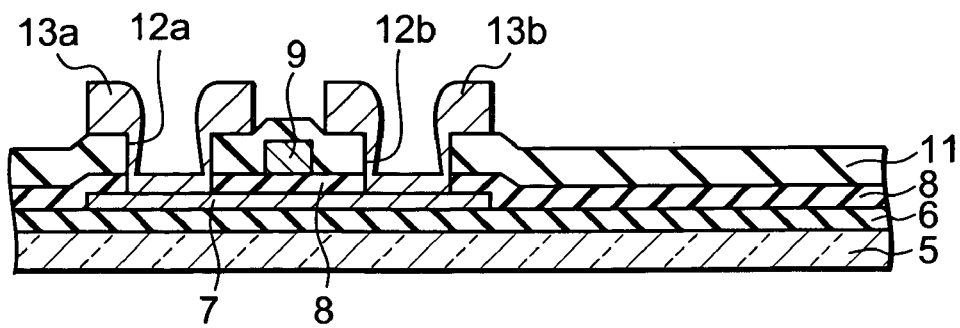

Next, as shown in FIG. 5D, an Al layer is deposited by the sputtering method and patterned, whereby SD wiring layers 13a and 13b are formed in the portions including the areas immediately above the contact holes 12a and 12b on the contact oxide film 11. At this time, the Al layer is deposited also on the inner walls and bottom surfaces of the contact holes 12a and 12b and, therefore, the SD wiring layers 13a and 13b are connected to the source and drain regions of the polycrystalline silicon layer 7, respectively, via the contact holes 12a and 12b. On the top surfaces of the SD wiring layers 13a and 13b, there are formed recesses which reflect the shapes of the contact holes 12a and 12b.

Figure 6A:
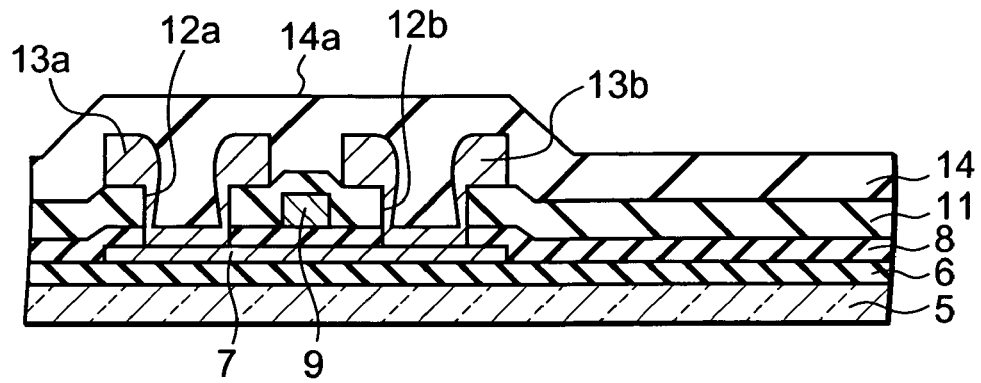
FIGS. 6A to 6C are each a sectional view which shows a method of manufacturing a TFT array substrate of a transmission type liquid crystal display apparatus related to this embodiment in order of steps, and that the steps after FIG. 5D.

Next, as shown in FIG. 6A, a silicon oxide film 14 is first formed by use of the normal pressure CVD device shown in FIG. 3. First, a glass substrate 5 shown in FIG. 4A to FIG. 5D is held by the substrate holder 53 due to be adsorbed onto the bottom surface of the substrate holder 53 by use of the vacuum adsorption device 55. The glass substrate is held with the surface on which the film is formed facing downward. And the temperature of the glass substrate 5 is heated to, for example, 350 to 400° C. by use of the heater 54, and the substrate holder 53 perform reciprocating motions in the horizontal direction. TEOS is put into the silicon source 60, $O_3/O_2$ gas is supplied to the nozzle 57 of the dispersion head 56 through the supply tube 58, and simultaneously, the TEOS gas is supplied to the nozzle 57 through the supply pipe 59. At this time, with the flow ratio of the raw material gases set at $O_2$:TEOS:$N_2$=7.5:1.0 to 1.5:18.0 and the $O_3$ concentration in $O_2$ at 5 to 20 g/m$_3$, for example, 10 g/m$_3$, an $SiO_2$ film is formed by an $O_3$-TEOS reaction in a film thickness of, for example, 100 nm or so. As a result of this, a low concentration $O_3$-TEOS-based $SiO_2$ film is formed. Incidentally, the stoichiometric ratio of the Si to O in this film is not always strictly 1:2.

After that, with the glass substrate 5 kept housed within the normal pressure CVD device 51, subsequently a high concentration $O_3$-TEOS-based $SiO_2$ film is formed. At this time, with the substrate temperature set at 350 to 400° C., with the flow ratio of the raw material gases set at $O_2$: TEOS: $N_2$=7.5: 0.4 to 0.6:18.0 and the $O_3$ concentration in $O_2$ at 100 to 200 g/m$_3$, for example, 160 g/m$_3$, an $SiO_2$ film is formed by an $O_3$-TEOS reaction. As a result of this, a high concentration $O_3$-TEOS-based $SiO_2$ film is formed and hence a silicon oxide film 14 which is constituted by a two-layer film of the low concentration $O_3$-TEOS-based $SiO_2$ film and the high concentration $O_3$-TEOS-based $SiO_2$ film. Incidentally, the stoichiometric ratio of the Si to O in the high concentration $O_3$-TEOS-based $SiO_2$ film is not always strictly 1:2.

The silicon oxide film 14 is a second interlayer insulating film and its film thickness is, for example, equal to or more than 0.6 μm. At this time, high concentration $O_3$-TEOS-based $SiO_2$ film is deposited also in the interior of the recesses of the SD wiring layers 13a and 13b with the result that a flat surface 14a is formed in the area of the silicon oxide film 14 immediately above the polycrystalline silicon layer 7. Also, the area of the silicon oxide film 14 immediately above the polycrystalline silicon layer 7 has risen higher than the areas other than on the top surface of the silicon oxide film 14, and the flat surface 14a is in a higher position than the top surface of the silicon oxide film 14 in other areas.

Incidentally, the purpose of forming a low concentration $O_3$-TEOS-based $SiO_2$ film is to eliminate the dependence on the base material during the formation of a high concentration $O_3$-TEOS-based $SiO_2$ film. Therefore, in a case where a high concentration $O_3$-TEOS-based $SiO_2$ film is formed on a film in which defects such as abnormal growth do not occur and in a case where the dependence on the base material can be eliminated by performing wet treatment and the like, it is unnecessary to form a low concentration $O_3$-TEOS-based $SiO_2$ film.

Figure 6B:
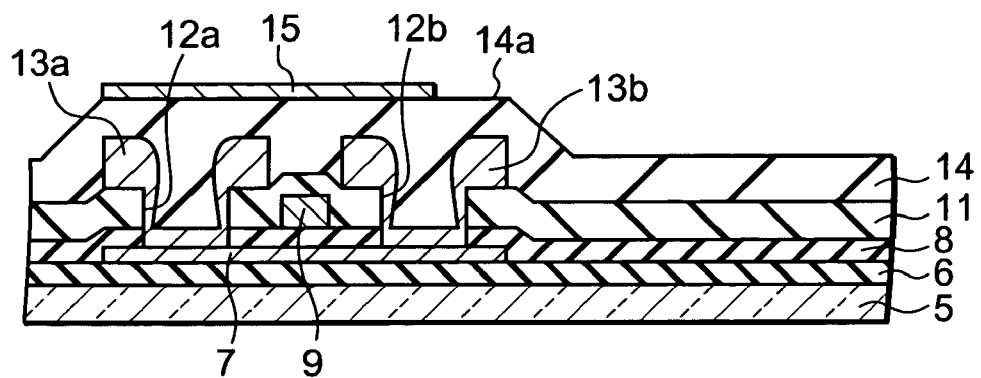
Figure 6C:
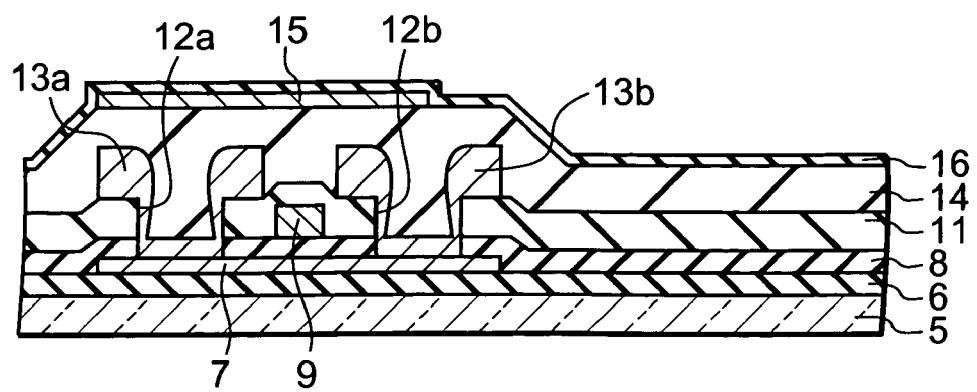

Next, as shown in FIG. 6B, Cr is deposited in a thickness of, for example, 0.2 μm in part of the area on the flat surface 14a, whereby a lower capacitor electrode 15 is formed. Next, as shown in FIG. 6C, a silicon oxide film 16 having a film thickness of, for example, 0.1 μm is formed in the whole area on the silicon oxide film 14 (the second interlayer insulating film) in such a manner as to cover the lower capacitor electrode 15.

Figure 7A:
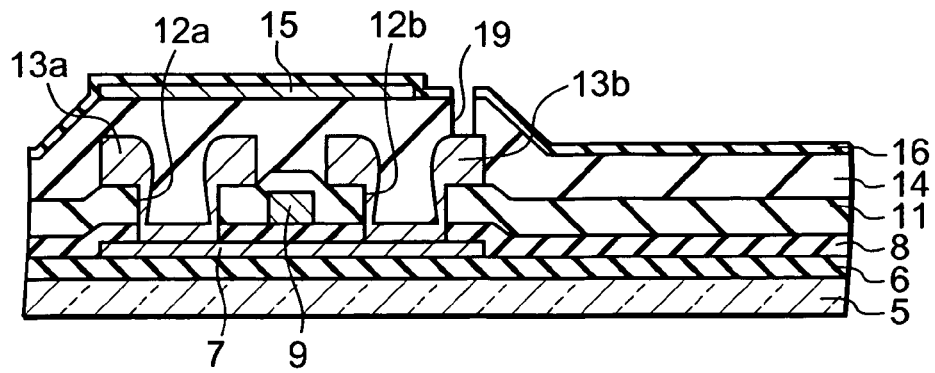
FIGS. 7A to 7C are each a sectional view which shows a method of manufacturing a TFT array substrate of a transmission type liquid crystal display apparatus related to this embodiment in order of steps, and that the steps after FIG. 6C.
Figure 7B:
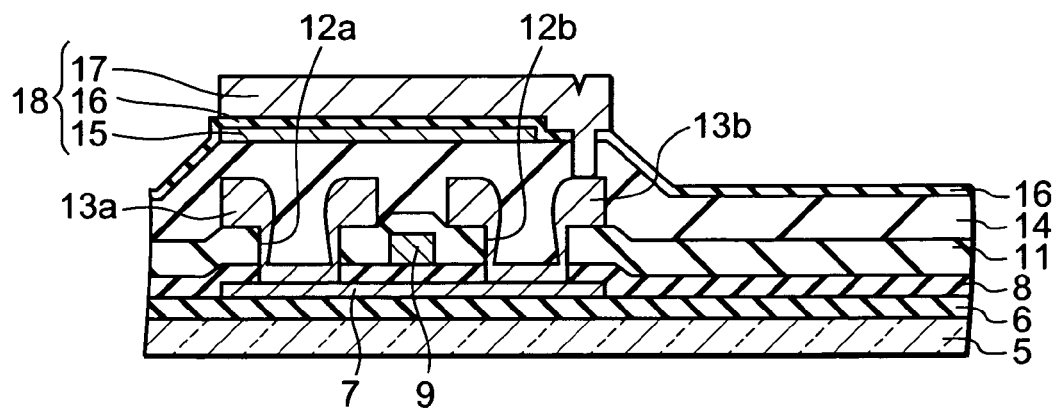

Next, as shown in FIG. 7A, a contact hole 19 which reaches the SD wiring layer 13b is formed in the area immediately above the polycrystalline silicon layer 7 in the silicon oxide film 14 (the second interlayer insulating film) and the silicon nitride film 16. The contact hole is formed in the area in which the lower capacitor electrode 15 is not formed. Next, as shown in FIG. 7B, in a portion which includes both the area immediately above the lower capacitor electrode 15 on the silicon nitride film 16 and the area immediately above the contact hole 19, an Al film is formed by sputtering in a thickness of, for example, 0.2 μm, whereby an upper capacitor electrode 17 is formed. At this time, it is ensured that the interior of the contact hole 19 is also embedded with Al. As a result of this, the upper capacitor electrode 17 is connected to the SD wiring layer 13b via the contact hole 19. Also, the portion of the silicon nitride film 16 present between the lower capacitor electrode 15 and the upper capacitor electrode 17 becomes a capacitor insulating film. As a result of this, a storage capacitor 18 is formed by the lower capacitor electrode 15, the silicon nitride film 16 (capacitor insulating film) and the upper capacitor electrode 17. The upper capacitor electrode 17 serves also as a light shielding film.

Figure 7C:
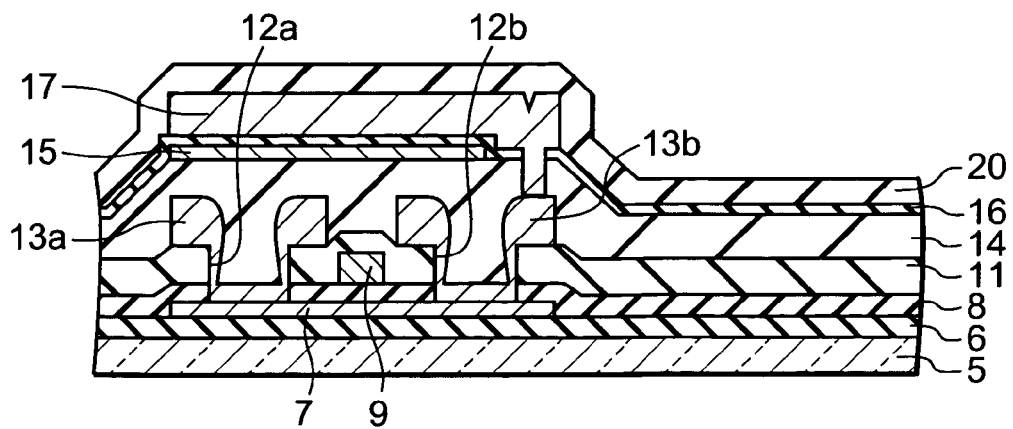

Next, as shown in FIG. 7C, a silicon nitride film 20 having a film thickness of, for example, 0.4 μm is formed in the whole area on the silicon nitride film 16 in such a manner as to cover the upper capacitor electrode 17. The silicon nitride film 20 is a third interlayer insulating film.

Figure 8A:
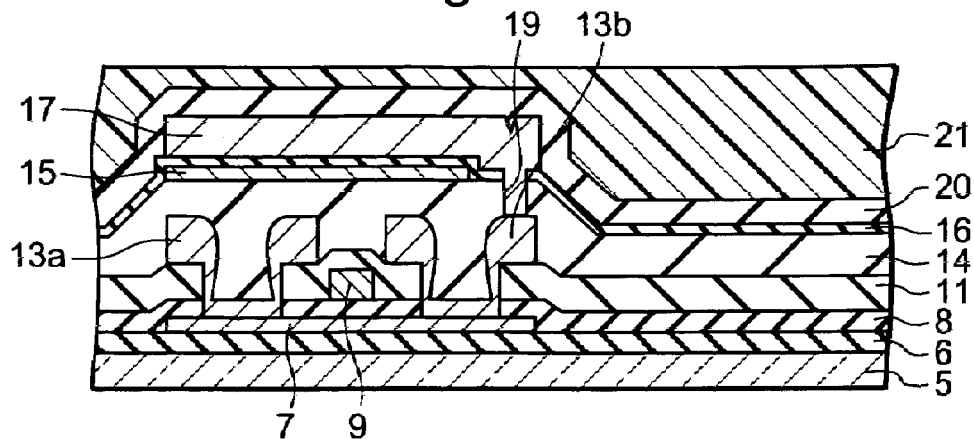
FIGS. 8A to 8C are each a sectional view which shows a method of manufacturing a TFT array substrate of a transmission type liquid crystal display apparatus related to this embodiment in order of steps, and that the steps after FIG. 7C.
Figure 8B:
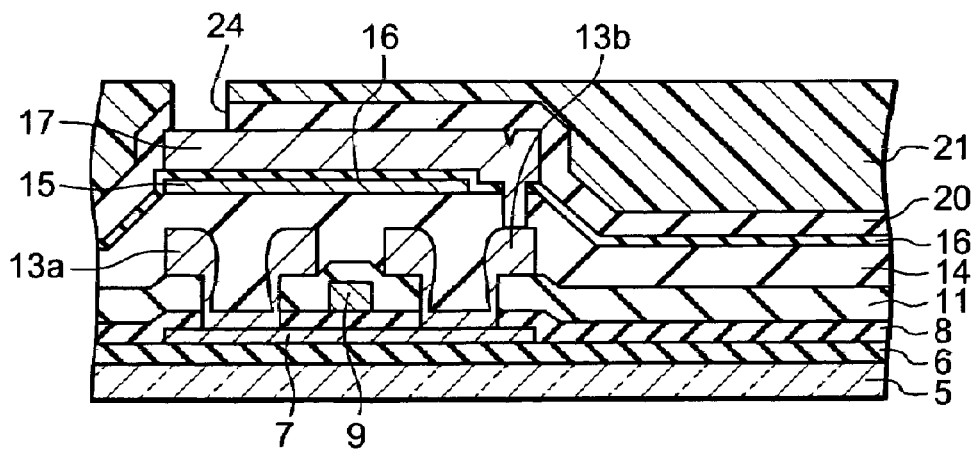

Next, as shown in FIG. 8A, an organic planarization film 21 made of an acrylic organic resin is formed by the application method in an average film thickness of, for example, 1.2 μm in the whole area on the silicon nitride film 20 (the third interlayer insulating film). At this time, the top surface of the organic planarization film 21 becomes flat and hence the area immediately above the polycrystalline silicon layer 7 on this top surface and areas other than this area immediately above the polycrystalline silicon layer 7 also become same level with each other. Next, as shown in FIG. 8B, a contact hole 24 which reaches the upper capacitor electrode 17 is formed in part of the portion of the silicon nitride film 20 (third interlayer dielectric layer) and organic planarization film 21 corresponding to the area immediately above the upper capacitor electrode 17.

Figure 8C:
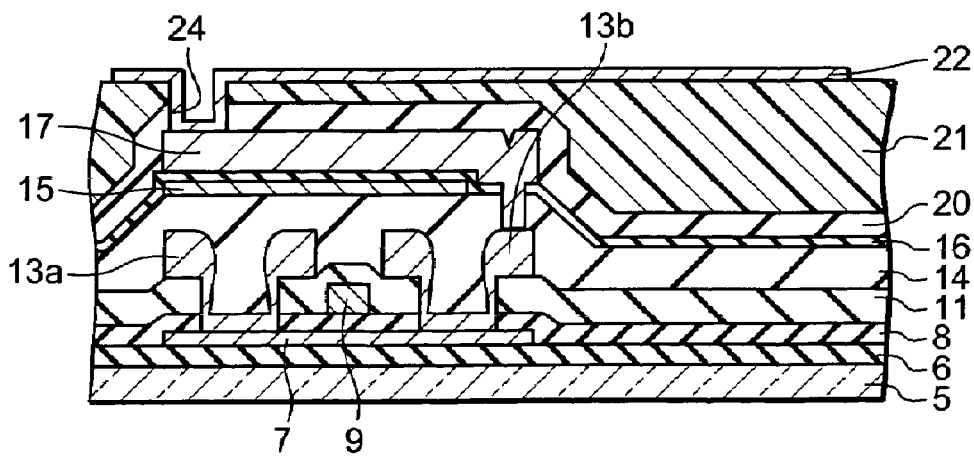

Next, as shown in FIG. 8C, an ITO film is formed by sputtering on the organic planarization film 21 and this ITO film is patterned, whereby a pixel electrode 22 is formed. The pixel electrode 22 is formed in a region which includes the contact hole 24 for each pixel. As a result of this, the pixel electrode 22 is connected to the upper capacitor electrode 17 via the contact hole 24.

Next, as shown in FIG. 1, an alignment film 23 is formed in a whole area on the organic planarization film 21 in such a manner as to cover the pixel electrode 22. As a result of this, a TFT array substrate 2 is formed.

On the other hand, as shown in FIG. 1, a glass substrate 31 is prepared, and an ITO film is formed by sputtering on the surface of this glass substrate 31, whereby an counter electrode 32 formed from ITO is formed. Next, an alignment film 33 is formed on the counter electrode 32. As a result of this, a counter substrate 3 is fabricated.

And the TFT array substrate 2 and the counter substrate 3 are bonded together via a spacer (not shown) in such a manner that the alignment film 23 and the alignment film 33 are opposed to each other. Next, a liquid crystal is implanted between the TFT array substrate 2 and the counter substrate 3, whereby a liquid crystal layer 4 is formed. As a result of this, a transmission type liquid crystal display apparatus 1 is manufactured. The advantages of this embodiment are the same as in the above-described first embodiment.

Incidentally, in the above-described first and second, embodiments, an example in which in the step shown in FIG. 6A, the upper layer of the silicon oxide film 14 (second interlayer insulating film) is formed from a high concentration $O_3$-TEOS-based $SiO_2$ film was shown. However, the present invention is not limited to this, and the upper layer of the silicon oxide film 14 may be formed from an $SiO_2$ film formed by an $O_3$-HMDSO (hexamethyldisiloxane) reaction by a normal pressure CVD method (hereinafter referred to a high concentration $O_3$-HMDSO-based $SiO_2$ film). This high concentration $O_3$-HMDSO-based $SiO_2$ film is formed as the upper layer of the silicon oxide film 14 by use of the normal pressure CVD device 51 shown in FIG. 3 after the formation of a low concentration $O_3$-TEOS-based $SiO_2$ film as the lower layer of the silicon oxide film 14 by use of the normal pressure CVD device 51. At this time, HMDSO is supplied beforehand in place of TEOS to the silicon source 60 of the normal pressure CVD device 51. And the $O_3$ concentration in $O_2$ should be 100 to 200 g/m³, for example, 160 g/m³. Even in the case of a high concentration $O_3$-HMDSO-based $SiO_2$ film, as with a high concentration $O_3$-TEOS-based $SiO_2$ film, the recesses of the SD wiring layers 13a and 13b can be embedded and a flat surface 14a can be formed in the area of the silicon oxide film 14 immediately above the polycrystalline silicon layer 7. Incidentally, the stoichiometric ratio of the Si to O in the high concentration $O_3$-HMDSO-based $SiO_2$ film is not always strictly 1:2.

In addition, the second interlayer insulating film is made of $O_3$-TEOS-based $SiO_2$ film or $O_3$-HMDSO-based $SiO_2$ film in above mentioned embodiment, however, the insulating film may be made of a thick inorganic material which is formed by other than an $O_3$-alkoxysilane reaction or by an $O_3$-hexamethyldisiloxane reaction by a normal pressure CVD method. In that case, the second interlayer insulating film is formed into sufficient thickness for eliminating an irregularity and then this insulating film can be planarized by polishing by CMP (chemical mechanical polishing), and a storage capacitor can be formed on the insulating film.

Figure 9:
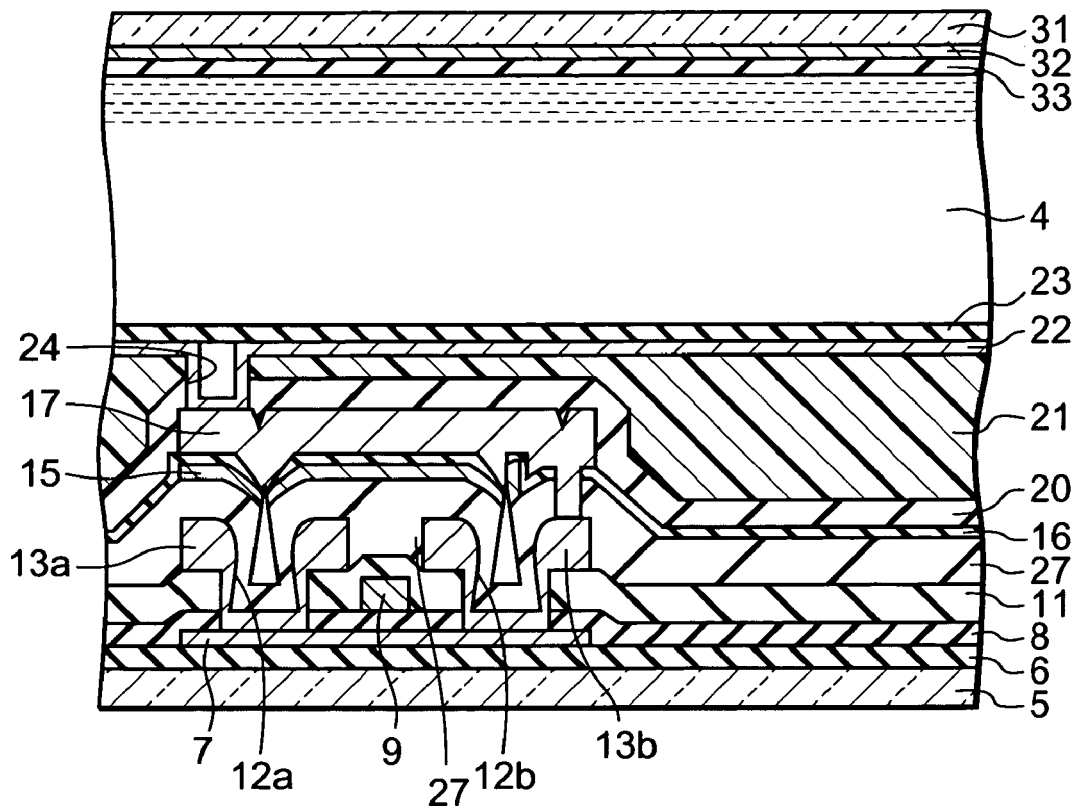
FIG. 9 is a sectional view of a transmission type liquid crystal display apparatus related to a comparative example of the present invention.

Next, in order to make the advantages of the above-described first and second embodiments clearer, a comparative example will be described. FIG. 9 is a sectional view of a transmission type liquid crystal display apparatus related to a comparative example of the present invention. As shown in FIG. 9, in this comparative example, a silicon oxide film 27 is provided as a second interlayer insulating film in place of the silicon oxide film 14 in the above-described first and second embodiments. The silicon oxide film 14 in the first and second embodiments is a laminated film of a low concentration $O_3$-TEOS-based $SiO_2$ film and a high concentration $O_3$-TEOS-based $SiO_2$ film both formed by an $O_3$-TEOS reaction, whereas the silicon oxide film 27 is a TEOS-based $SiO_2$ film formed by the PECVD (plasma-enhanced chemical vapor deposition) method. In this comparative example, the silicon oxide film 27 is not formed into sufficient thickness, for eliminating an irregularity. The constitution and manufacturing method other than the foregoing in this comparative example are the same as in the above-described first and second embodiments.

In this comparative example, the silicon oxide film 27 is formed as the second interlayer insulating film by the PECVD method and the recesses of the SD wiring layers 13a and 13b with the silicon oxide film 27 is not completely embedded. For this reason, recesses which reflect the shapes of the recesses of the SD wiring layers 13a and 13b are formed on the top surface of the silicon oxide film 27 and hence the portion of the top surface of the silicon oxide film 27 corresponding to the area immediately above the polycrystalline silicon 7 cannot be made flat. As a result of this, the lower capacitor electrode 15 and higher capacitor electrode 17 disposed on the silicon oxide film 27 cannot be formed flat, and in the areas immediately above the contact holes 12a and 12b, the lower capacitor electrode 15 and higher capacitor electrode 17 are displaced downward and the spacing between the two electrodes becomes short. As a result of this, capacitor leakage occurs in this portion and image contrast decreases.

Figure 10:
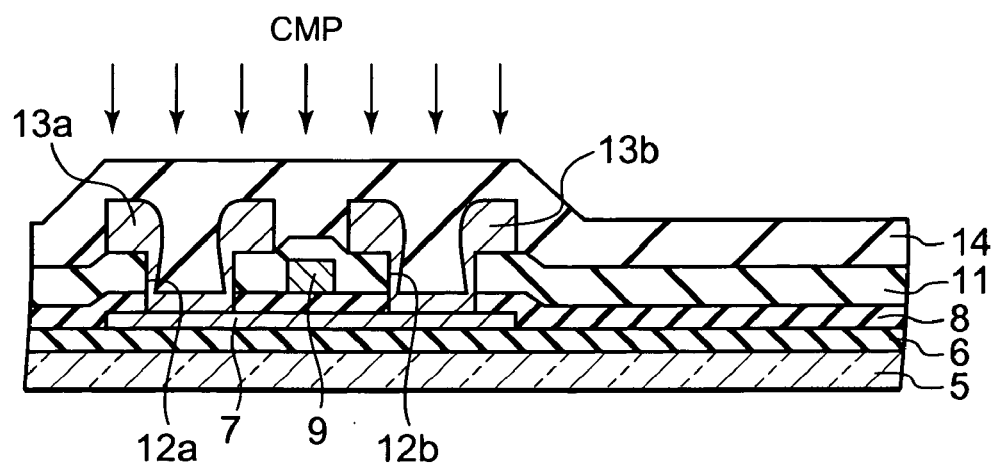
FIG. 10 is a sectional view of a diagram of a TFT array substrate of a transmission type liquid crystal display apparatus related to the third embodiment of the present invention.

Next, the third embodiment of the present invention will be described. FIG. 10 is a sectional view of a diagram of a TFT array substrate of a transmission type liquid crystal display apparatus related to the third embodiment of the present invention. The transmission type liquid crystal display apparatus related to this embodiment differs from the transmission type liquid crystal display apparatus 1 related to the above-described first embodiment in that the flat surface 14a of the silicon oxide film 14 is polished 50 to 100 nm or so by CMP. The constitution other than the foregoing in this embodiment is the same as in the above-described first embodiment.

Next, a method of manufacturing a transmission type liquid crystal display apparatus related to this embodiment will be described. First, a silicon oxide film 6 (base film) and a TFT 10 are formed on a glass substrate 5 in the steps shown in FIGS. 4A to 4E, FIGS. 5A to 4D and FIG. 6A, and a silicon oxide film 14 (second interlayer insulating film) is formed in such a manner as to embed this TFT 10.

Next, as shown in FIG. 10, the flat surface 14a of the silicon oxide film 14 is polished, for example, 50 to 100 nm or so by CMP. Incidentally, as described above, the flat surface 14a is the region of the silicon oxide film 14 corresponding to the area immediately above the polycrystalline silicon layer 7, i.e., the region in which the storage capacitor 18 is to be formed.

Next, in the steps shown in FIGS. 6B and 6C, FIGS. 7A to 7C and FIGS. 8A to 8C, the storage capacitor 18, silicon nitride film 20 (third interlayer insulating film), organic planarization film 21, pixel electrode 22, alignment film 23, etc. are formed on the silicon oxide film 14 the flat surface 14a of which has been polished by CMP, whereby a TFT array 2 is fabricated. And this TFT array substrate 2 and the counter substrate 3 are superposed on each other and a liquid crystal is implanted between the two substrates, whereby a transmission type liquid crystal display apparatus is manufactured.

Compared to the first and second embodiments, in this embodiment it is possible to more positively improve the flatness of the flat surface 14a, i.e., the flatness of the base material on the lower capacitor electrode is formed. As a result of this, due to variations in the film thickness of the Al layer which constitutes the DS wiring layers 13a and 13b, for example, due to the formation of irregularly thick portions in the film thickness of the Al layer, even in a case where the irregularities of the top surfaces of the SD wiring layers 13a and 13b become larger than usual and the surface flatness of the silicon oxide film 14 immediately after the formation thereof becomes low, by polishing this portion by CMP, it is possible to ensure the flatness of the flat surface 14a. Thus, although this embodiment is disadvantageous because of the CMP step in terms of manufacturing cost compared to the above-described second embodiment, it is possible to positively eliminate the irregularities of the flat surface 14a ascribed to variations in the manufacturing process. Hence, the flatness of the flat surface 14a can be more improved. Therefore, the quality stability of a transmission type liquid crystal display apparatus and, at the same time, capacitor breakdown voltage can be further improved. Advantages of this embodiment other than the foregoing are the same as in the above-described first and second embodiments.

Incidentally, also in this embodiment, a high concentration $O_3$-HMDSO-based $SiO_2$ film may be formed as the upper layer of the silicon oxide film 14 (second interlayer insulating film) in place of a high concentration $O_3$-TEOS-based $SiO_2$ film.

Figure 11:
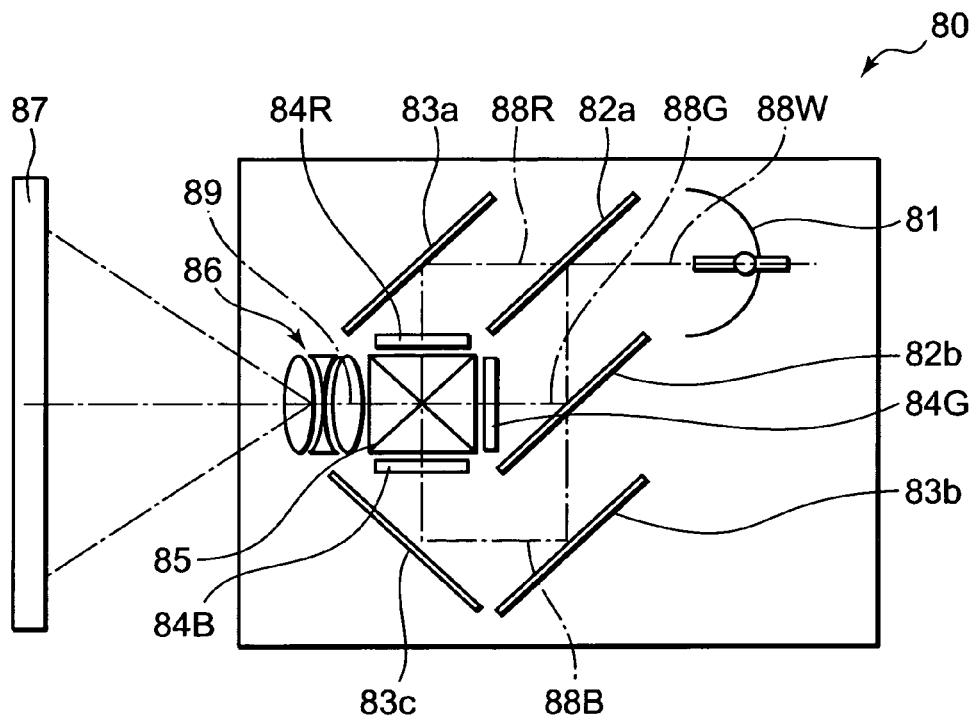
FIG. 11 is a sectional view of a liquid crystal projector apparatus related to the fourth embodiment of the present invention.

Next, the fourth embodiment of the present invention will be described. FIG. 11 is a drawing which shows a liquid crystal projector as a projector apparatus related to this embodiment. A liquid crystal display apparatus related to this embodiment is, for example, a front projection type projector. However, this maybe a front projection type home projector or a rear projection type home projector.

As shown in FIG. 11, in a liquid crystal projector apparatus 80 related to this embodiment, a halogen lamp 81 which emits white light is provided as a light source. A half mirror 82a which transmits red light and reflects green light and blue light is provided in a position which is irradiated with the white light emitted from the halogen lamp 81, and a mirror 83a is provided in a position which is irradiated with the red light transmitted through the half mirror 82a. Furthermore, a half mirror 82b which transmits blue light and reflects green light is provided in a position which is irradiated with the light reflected by the half mirror 82a, and mirrors 83b and 83c are provided in this order along a path of light of the blue light transmitted through the half mirror 82b.

A light bulb for red color 84R is provided in such a manner as to lie in the light path of red light reflected by the mirror 83a, a light bulb for green color 84G is provided in such a manner as to lie in the light path of green light reflected by the half mirror 82b, and a light bulb for blue color 84B is provided in such a manner as to lie in the light path of blue light reflected by the mirror 83c. The light bulb for red color 84R, the light bulb for green color 84G and the light bulb for blue color 84B are each a monochromatic liquid crystal display apparatus and is a transmission type liquid crystal display apparatus related to the above-described first or third embodiment.

Furthermore, in a position on which the light transmitted through the light bulb for red color 84R, the light transmitted through the light bulb for green color 84G and the light transmitted through the light bulb for blue color 84B become incident, there is provided prism 85 which synthesizes these three kinds of light, and an injection lens group 86, which enlarges and projects the synthetic light onto a screen 87 provided outside the liquid crystal projector 80, is provided in such a manner as to line in the light path of the synthetic light emitted from the prism 85.

Next, a description will be given of the operation of the liquid crystal projector apparatus related to this embodiment which is constructed as described above. First, the light bulb for red color 84R, the light bulb for green color 84G and the light bulb for blue color 84B are caused to display, respectively, an image for red color, an image for green color and an image for blue color. When the halogen light 81 is caused to light up in this state, the white light 88W emitted from the halogen lamp 81 reaches the half mirror 82a, and among the light of various colors that compose this white light 88W, the red light 88R is transmitted through the half mirror 82a and the green light 88G and the blue light 88B are reflected by the half mirror 82a. The red light 88R transmitted through the half mirror 82a is reflected by the half mirror 83 and becomes incident on the light bulb for red color 84R.

On the other hand, the green light 88G and blue light 88B reflected by the half mirror 82a reach the half mirror 82b, the blue light 88B is transmitted through the half mirror 82b, and the green light 88G is reflected by the half mirror 82b. The green light 88G reflected by the half mirror 82b becomes incident on the light bulb for green color 84G. The blue light 88B transmitted through the half mirror 82b is reflected by the mirrors 83b and 83c, and become incident on the light bulb for blue light 84B.

The red light 88R reflected by the mirror 83a is transmitted through the light bulb for red color 84R, with an image for red light added due to this transmission, and becomes incident on the prism 85. The green light 88G reflected by half mirror 82b is transmitted through the light bulb for green color 84G, with an image for green light added due to this transmission, and becomes incident on the prism 85. Furthermore, the blue light 88B reflected by mirror 83c is transmitted through the light bulb for blue color 84B, with an image for blue light added due to this transmission, and becomes incident on the prism 85. And the red light 88R, the green light 88G and the blue light 88B are synthesized by the prism 85, the synthetic light is emitted as while light 89 from the prism 85, enlarged by the projection lens group 86, and projected on the screen 87 to an enlarged scale.

In this embodiment, the aperture ratio of the transmission type liquid crystal display apparatus which constitutes the light bulb for red color 84R, the light bulb for green color 84G and the light bulb for blue color 84B is high and a high-quality image having high brightness and high contrast can be displayed. Therefore, also an image projected by the liquid crystal projector apparatus 80 on the screen 87 also becomes a high quality image having high brightness and high contrast.

Incidentally, an alignment of the light bulbs is not limited above.

The present invention can be advantageously used in a light bulb of a front projection type projector, a front projection type home projector and a rear projection type home projector.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is the inventor's intent to retain all equivalents of the claimed invention even if the claims are amended during prosecution.

What is claimed is:

1. A pixel circuit substrate comprising:
   a substrate;
   a thin film transistor formed on said substrate;
   a first interlayer insulating film comprising an inorganic material at least in source and drain regions of said thin film transistor, said first interlayer insulating film having a contact hole formed in an area immediately above said source and drain regions of said thin film transistor;
   a wiring layer which arranged on said first interlayer insulating film, extending to an inner wall and a bottom surface of said contact hole, the wiring layer being connected to said source and drain regions, a top surface of the wiring layer having a recess reflecting a shape of said contact hole;
   a second interlayer insulating film comprising a laminate of inorganic material, formed on said wiring layer and embedded in said recess, the second interlayer insulating film being a laminate to have a uniformly flat top surface in an area immediately above said thin film transistor including said source and drain regions; and
   a storage capacitor on said second interlayer insulating film disposed in said area immediately above said thin film transistor.

2. A liquid crystal display apparatus comprising:
   the pixel circuit substrate according to claim 1;
   a counter substrate;
   a liquid crystal layer disposed between said pixel circuit substrate and said counter substrate.

3. The liquid crystal display apparatus according to claim 2, wherein said second interlayer insulating film comprises a silicon oxide film.

4. The liquid crystal display apparatus according to claim 3, wherein said silicon oxide film is formed by an $O_3$-alkoxysilane reaction by a normal pressure CVD method.

5. The liquid crystal display apparatus according to claim 4, wherein said silicon oxide film is formed under a condition in which the $O_3$ concentration in $O_2$ is in a range of 100 to 200 g/m$^3$, and said liquid crystal display apparatus further comprises a base film made of a silicon oxide film under said second interlayer insulating film by an $O_3$-alkoxysilane reaction by a normal pressure CVD method in which the $O_3$ concentration in $O_2$ is in a range of 5 to 20 g/m$^3$.

6. The liquid crystal display apparatus according to claim 3, wherein said silicon oxide film is formed by an $O_3$-hexamethyldisiloxane reaction by a normal pressure CVD method.

7. The liquid crystal display apparatus according to claim 6, wherein said silicon oxide film formed under the condition in which the $O_3$ concentration in $O_2$ is in a range of 100 to 200 g/m$^3$, and said liquid crystal display apparatus further comprises a base film made of a silicon oxide film under said second interlayer insulating film by an $O_3$-alkoxysilane reaction by a normal pressure CVD method in which the $O_3$ concentration in $O_2$ is in a range of 5 to 20 g/m$^3$.

8. The liquid crystal display apparatus according to claim 2, wherein a top surface of a portion of said second interlayer insulating film corresponding to said area immediately above said thin film transistor is in a position higher than a top surface of a portion corresponding to said region other than said region immediately above said thin film transistor.

9. The liquid crystal display apparatus according to claim 2, wherein when the unit area of each pixel is denoted by X and a total value of an effective area of a contact hole in each pixel is denoted by Y, the value of the ratio (Y/X) is equal to or greater than 0.01.

10. The liquid crystal display apparatus according to claim 2, wherein said pixel circuit substrate and said counter substrate are made of a transparent material and said liquid crystal display apparatus is a transmission type liquid crystal display apparatus.

11. A projection display apparatus, comprising:
    a light source; and
    said liquid crystal display apparatus according to claim 10, which is disposed in such a manner as to lie on a path of light emitted from said light source.

12. A pixel circuit substrate, comprising:
    a substrate;
    a thin film transistor formed on said substrate;
    a first interlayer insulating film comprising silicon oxide at least in source and drain regions of said thin film transistor, said first interlayer insulating film having a contact hole formed in an area immediately above said source and drain regions of said thin film transistor;
    a wiring layer which arranged on said first interlayer insulating film, extending to an inner wall and a bottom surface of said contact hole, the wiring layer being connected to said source and drain regions, a top surface of the wiring layer having a recess reflecting a shape of said contact hole;
    a second interlayer insulating film comprising a laminate of silicon oxide, formed on said wiring layer and embedded in said recess, the second interlayer insulating film being a laminate to have a uniformly flat top surface in an area immediately above said thin film transistor including said source and drain regions; and
    a storage capacitor on said second interlayer insulating film disposed in said area immediately above said thin film transistor.

13. The pixel circuit substrate according to claim 12, wherein said second interlayer insulating film is formed by an $O_3$-alkoxysilane reaction by a normal pressure CVD method.

14. The pixel circuit substrate according to claim 13 wherein said second interlayer insulating film is formed under a condition in which an $O_3$ concentration in $O_2$ is in a range of 100 to 200 g/m$^3$, and said liquid crystal display apparatus further comprises a base film made of a silicon oxide film under said second interlayer insulating film by an $0_3$-alkoxysilane reaction by a normal pressure CVD method in which the $O_3$ concentration in $O_2$ is in a range of 5 to 20 g/m$^3$.

15. The pixel circuit substrate according to claim 12, wherein said second interlayer insulating film is formed by an $O_3$-hexamethyldisiloxane reaction by a normal pressure CVD method.

16. The pixel circuit substrate according to claim 15, wherein said second interlayer insulating film is formed under the condition in which the $O_3$ concentration in $0_2$ is in a range of 100 to 200 g/m$^3$, and said liquid crystal display apparatus further comprises a base film made of a silicon oxide film under said second interlayer insulating film by an O$_3$-alkoxysilane reaction by a normal pressure CVD method in which an O$_3$ concentration in O$_2$ is in a range of 5 to 20 g/m$^3$.

17. The pixel circuit substrate according to claim 12, wherein a top surface of a portion of said second interlayer insulating film corresponding to said area immediately above said thin film transistor is in a position higher than a top surface of a portion corresponding to said region other than said region immediately above said thin film transistor.

18. The pixel circuit substrate according to claim 12, wherein when the unit area of each pixel is denoted by X and a total value of an effective area of a contact hole in each pixel is denoted by Y, the value of the ratio (Y/X) is equal to or greater than 0.01.

19. The pixel circuit substrate according to claim 12, wherein said substrate is made of a transparent material, and said pixel circuit substrate is part of a transmission type liquid crystal display apparatus.

* * * * *

UNITED STATES PATENT AND TRADEMARK OFFICE
CERTIFICATE OF CORRECTION

PATENT NO. : 7,626,648 B2 Page 1 of 1
APPLICATION NO. : 11/242935
DATED : December 1, 2009
INVENTOR(S) : Shiota et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 546 days.

Signed and Sealed this

Twenty-first Day of December, 2010

David J. Kappos
*Director of the United States Patent and Trademark Office*